(12) United States Patent
Molson et al.

(10) Patent No.: US 7,676,355 B1
(45) Date of Patent: Mar. 9, 2010

(54) METHOD AND APPARATUS FOR PROVIDING PROTECTED INTELLECTUAL PROPERTY

(75) Inventors: Philippe Molson, San Jose, CA (US); Tony San, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 122 days.

(21) Appl. No.: 11/372,599

(22) Filed: Mar. 10, 2006

Related U.S. Application Data

(63) Continuation of application No. 09/823,700, filed on Mar. 30, 2001, now Pat. No. 7,089,173.

(60) Provisional application No. 60/199,927, filed on Apr. 26, 2000.

(51) Int. Cl.
*G06F 17/50* (2006.01)

(52) U.S. Cl. .................. 703/14; 716/4; 716/17

(58) Field of Classification Search .............. 703/22, 703/14, 23; 710/62; 341/50, 155; 345/98; 716/3, 4, 10, 17, 18, 1; 326/31, 38; 726/26; 705/51; 713/153
See application file for complete search history.

(56) References Cited

U.S. PATENT DOCUMENTS

| | | |
|---|---|---|
| 4,435,752 A | 3/1984 | Winkelman |
| RE31,736 E | 11/1984 | Mueller et al. |
| 5,375,240 A | 12/1994 | Grundy |
| 5,757,908 A | 5/1998 | Cooper et al. |
| 5,802,376 A | 9/1998 | Deroo et al. |
| 5,892,900 A | 4/1999 | Ginter et al. |
| 5,982,683 A | 11/1999 | Watson et al. |
| 6,023,565 A | 2/2000 | Lawman et al. |
| 6,026,220 A | 2/2000 | Cleereman et al. |
| 6,102,961 A * | 8/2000 | Lee et al. ............ 716/1 |

(Continued)

OTHER PUBLICATIONS

Kahng et al., "Watermarking techniques for intellectual property protection", Design Automation Conference, Jun. 1998.*

(Continued)

*Primary Examiner*—Paul L Rodriguez
*Assistant Examiner*—Kandasamy Thangavelu
(74) *Attorney, Agent, or Firm*—Weaver Austin Villeneuve & Sampson LLP

(57) ABSTRACT

Various techniques permit more thorough development of digital systems and devices by designers while protecting the proprietary interests of the owners of the intellectual property incorporated in such systems and devices. More specifically, the present invention provides to an end customer IP hardware which is suitable for prototype testing, but unusable for production purposes. One method limits the physical or electrical mode of operation of a hardware platform used for prototype testing of intellectual property (such as limiting the number of electrical contacts between the hardware and an external electrical device or limiting the data format(s) usable in the hardware during prototype testing). Another method limits the temporal operation of a hardware platform using an internal counter within the software provided by the intellectual property owner. Once a clock count limit is reached, the software disables the hardware in one or more prescribed ways, such as a reset of one or more registers, a global tri-state of the hardware 10, or a random failure of some type. Suitable hardware fabrication and/or augmentation also may be used to differentiate between the prototype and production manners of operation.

12 Claims, 6 Drawing Sheets

U.S. PATENT DOCUMENTS

| | | | |
|---|---|---|---|
| 6,120,549 | A | 9/2000 | Goslin et al. |
| 6,157,317 | A | 12/2000 | Walker |
| 6,173,245 | B1 | 1/2001 | Karchmer et al. |
| 6,216,258 | B1 | 4/2001 | Mohan et al. |
| 6,317,872 | B1 | 11/2001 | Gee et al. |
| 6,336,107 | B1 | 1/2002 | Uchida et al. |
| 6,346,427 | B1 | 2/2002 | Gardner et al. |
| 6,421,251 | B1 | 7/2002 | Lin |
| 6,446,243 | B1 * | 9/2002 | Huang et al. .................... 716/7 |
| 6,480,027 | B1 | 11/2002 | Ngai et al. |
| 6,487,699 | B1 * | 11/2002 | Devins et al. .................. 716/4 |
| 6,507,592 | B1 | 1/2003 | Hurvig et al. |
| 6,536,028 | B1 * | 3/2003 | Katsioulas et al. ............ 716/17 |
| 6,546,507 | B1 | 4/2003 | Coyle et al. |
| 6,557,020 | B1 | 4/2003 | Amano et al. |
| 6,587,995 | B1 * | 7/2003 | Duboc et al. ................... 716/4 |
| 6,633,788 | B1 | 10/2003 | Riley et al. |
| 6,658,045 | B1 | 12/2003 | Jin |
| 6,697,948 | B1 | 2/2004 | Rabin et al. |
| 6,904,527 | B1 * | 6/2005 | Parlour et al. ............... 713/189 |
| 7,133,845 | B1 * | 11/2006 | Ginter et al. .................. 705/51 |
| 7,165,174 | B1 * | 1/2007 | Ginter et al. ................ 713/153 |
| 2001/0021926 | A1 | 9/2001 | Schneck et al. |

OTHER PUBLICATIONS

Lach et al., "Signature hiding techniques for FPGA intellectual property protection", ACM 1998.*

Lach et al., "Robust FPGA Intellectual property protection through multiple small watermarks", ACM 1999.*

Intellectual property protection development working group, "Intellectual property protection: schemes, alternatives and discussion", Aug. 2000.*

Cooke, L.H., "VSIA—Its advantagesfrom four different perspectives", IEEE, 1997.*

Draft Developer's Documentation sent to Developers with Sample Code For Testing, Dec. 19, 1997. ("MegaWizard® Plug-In Manager-Megafunction Wizards Information Exchange Requirements").

Press Release from Altera Corporation, Altera's Mega Wizard Plug-Ins Offer the First Too-Independent Parameterized Logic Cores, Feb. 2, 1998.

"A Developers Guide to the Design of MegaWizard® Megafunction Wizards," Documentation for Developers Provided with Final Product Release, Jun. 30, 1998.

"Mega Wizard Plug-Ins," provided on Altera Corporation's World Wide Web Home Page (www.altera.com), prior to Jan. 11 1999.

"Altera Megafunctions," provided on Altera Corporation's World Wide Web Home Page (www.altera.com), prior to Jan. 11, 1999.

"AMPP Megafunction: Telephone Tone Generation Megafunction," Provided on Altera Corporation's World Wide Web Home Page (www.altera.com), prior to Jan. 11, 1999.

"Introduction to Megafunctions," provided on Altera Corporation's World Wide Web Home Page (www.altera.com), prior to Jan. 11, 1999.

PowerPoint® presentation describing "Megafunction Wizard" functionality made Nov. 1997.

Lightbody et al., "Rapid Design of a Single Chip Adaptive Beamformer," IEEE. 1998.

Dick et al., "MOCSYN: Multiobjective Core-Based Single-Chip System Synthesis," ACM 1999.

Hong et al., "Behavioral Synthesis Techniques for Intellectual Property Protection," Proceedings of the 36th Annual Conference on Design Automation (DAC '99), pp. 849-854, 1999.

Gupta et al., "Introducing Core-Based System Design," Design & Test of Computers, IEEE, vol. 14, Issue: 4, pp. 15-25, 1997.

Lach et al., "FPGA Fingerprinting Techniques for Protecting Intellectual Property," Proceedings of CICC, 4 pages, 1998.

* cited by examiner

METHOD AND APPARATUS FOR PROVIDING PROTECTED INTELLECTUAL PROPERTY

CROSS-REFERENCE TO RELATED APPLICATIONS

This application is a continuation of U.S. patent application has been changed to Ser. No. 09/823,700, filed Mar. 30, 2001, currently issued as U.S. Pat. No. 7,089,173 on Aug. 8, 2006 which claims the benefit of U.S. Provisional Application No. 60/199,927, filed Apr. 26, 2000, wherein these references are hereby incorporated by reference for all purposes.

BACKGROUND OF THE INVENTION

1. Field of the Invention

This invention relates generally to methods, machine readable media and apparatus for protecting intellectual property ("IP"). More specifically, this invention relates to a technique for providing controlled use of IP.

2. Description of Related Art

Electronic design automation ("EDA") is becoming increasingly complicated and time consuming, due in part to the greatly increasing size and complexity of the electronic devices designed by EDA tools. Such devices include general purpose microprocessors as well as custom logic devices including programmable logic devices. The design of even the simplest of these devices typically involves generation of a high level design, logic simulation, generation of a network, timing simulation, etc.

A programmable logic device ("PLD") is a programmable integrated circuit that allows the user of the circuit, using software control, to program the PLD to perform particular logic functions. A wide variety of these devices are manufactured by Altera Corporation of San Jose, Calif. A more complete description of these types of devices and their uses can be found at "www.altera.com" and in various materials published by Altera, but the basic structure and operation of PLDs are well known to those of ordinary skill in the art. Logic functions performed by small, medium, and large-scale integration integrated circuits can instead be performed by programmable logic devices. When an integrated circuit manufacturer supplies a typical programmable logic device, it is not yet capable of performing any specific function. The user, in conjunction with software supplied by the manufacturer or created by the user or an affiliated source, can program the PLD to perform a particular function or functions required by the user's application. The PLD then can function in a larger system designed by the user just as though dedicated logic chips were employed.

One such improvement is the development of so-called "megafunctions" by companies such as Altera Corporation. A more complete description of these megafunctions and their uses can be found at "www.altera.com" and in various materials published by Altera. Briefly, megafunctions are ready made, pre-tested functional blocks that complement and augment existing design methodologies. When implementing complex system architectures, these megafunctions significantly enhance the design process. By using megafunctions, designers can focus more time and energy on improving and differentiating their system-level product, rather than re-designing common, off the shelf functions.

Megafunctions are pre-verified design files for complex system-level functions which reduce the design task to creating the custom logic surrounding such commonly used system-level functions, dramatically shortening the design cycle and leveraging existing IP. Typically, an IP owner provides all of the files necessary to design with the megafunctions. Current practice allows designers to instantiate, compile and simulate a function to verify its size and performance. However, programming files and output files for EDA tool simulation can be generated only with an authorization code provided when the megafunction is licensed. Test vectors and a post-synthesis design file (a fully minimized and optimized netlist that can be used without risk of changes during processing) are supplied for simulation in appropriate software (such as Altera's MAX+PLUS II and QUARTUS software products).

A typical design cycle (using, for example, Altera's Open-Core technology) is shown in FIG. 1. A designer creates an initial block diagram 110 and subsequently identifies any megafunctions available for use in the anticipated system 120. The designer then can identify and evaluate one or more specific megafunctions 130 in terms of functionality and the range of parameterization available. After finding the appropriate megafunction(s), the designer installs the megafunction(s) 140 and, using software, simulates performance 150 within the anticipated circuitry and system.

However, software simulations of these megafunctions in complex IP frequently are limited in a number of respects. For example, many hours of software simulation of a circuit used in a voice over technology might translate into only a few seconds of equivalent simulated circuit activity on a hardware platform. As a further example, components of devices may be able to achieve an extremely high number of states, all of which the designer may need to test. However, due to the relatively slow speed of some software simulations, only a limited number of states might be testable by such software simulation. Because a hardware platform may run at much higher speeds than software simulations, a designer may need to test the design on a hardware platform as well. With regard to PLDs, software simulation for several hours (representing a few seconds of PLD hardware operation) might represent appropriate sample testing for a design. Yet, to thoroughly validate the core of a PLD used in such an application, the system must run for a minute or more, thus making thorough software simulation testing impractical. Therefore, complex IP (for example, in video applications or voice over IP) should be evaluated and validated on a hardware platform before being purchased. In such applications, in order to fully validate and complete the system's design, as called for in step 160, the system frequently operates on a hardware prototype platform for a longer period of time than is practical for software simulation. A hardware prototype platform is substantially identical to the production version of the hardware a designer intends to create. The hardware prototype can be a PLD or other device, or a system or subsystem of the total design to be created. As will be appreciated by those of ordinary skill in the art, the particulars of a hardware prototype are dependent upon the needs and circumstances of the project being undertaken by a designer and will vary widely. In the context of this disclosure, the term "hardware prototype" will mean any hardware platform suitable for testing the hardware and available software for the system being designed. The term "production hardware" means the desired final configuration of any hardware that the designer intends to achieve.

Once this prototype validation is completed, the IP used can be incorporated into specific devices 170 and be put into production use. This prior design process has allowed IP owners to control use of their IP up through design simulation (step 150 in FIG. 1). After software simulation and synthesis, the IP owner provides a temporary license file to a customer, which authorizes the customer to generate a programming object file (a "POF" file) of the design containing the IP and to establish the hardware prototype.

To date, IP owners have had to rely on legal contracts and/or other, unverifiable means to limit and control use of their IP on hardware platforms during prototype testing (step 150 of FIG. 1) and during production use (step 170 of FIG. 1). Customers have been able to generate a POF file that could be used both for prototype testing as well as in production. Unauthorized use in production deprives the IP owner of compensation for use of its IP and inhibits the owner's control of its property. Attempts at technical measures to prevent unauthorized use of IP also have been only modestly effective. For example, there have been attempts to send an entire prototype "package" (a PLD with the system installed and with its own power supply) to a customer for limited testing. Such a pre-packaged system was intended to allow hardware testing, without unauthorized production use. However, the delicate nature of these systems and the need for the IP owner to incur significant costs in this method make it unattractive and ineffective.

Techniques that permit more thorough development of digital systems and devices by designers while protecting the proprietary interests of the owners of the intellectual property incorporated in such systems and devices would represent a significant advancement in the art. Moreover, these techniques can be extended to allow an IP owner to limit or prevent unauthorized use of its IP in other settings and contexts.

BRIEF SUMMARY OF THE INVENTION

The present invention provides to an end customer IP which is suitable for prototype testing or controllable production operation by the IP owner. One technique limits the physical or electrical mode of operation of a hardware platform using intellectual property (such as limiting the number of electrical contacts between the hardware and an external electrical device or limiting the data format(s) usable in the hardware during prototype testing). Another technique limits the temporal operation of a hardware platform. Once a clock count limit is reached, software disables the hardware in one or more prescribed ways, such as a reset of one or more registers, a global tri-state of the hardware 10, or a random failure of some type. Suitable hardware fabrication and/or augmentation also may be used to differentiate between the prototype and production manners of operation.

In one aspect, the present invention provides a method for limiting the operation of a protected intellectual property block on a programmable device. The method includes identifying license information associated with the protected intellectual property block, implementing the protected intellectual property block on the programmable device, and limiting the operation of the protected intellectual property on the programmable device based on the license information. The license information indicates whether the protected intellectual property block should be implemented with a limit on run time during which the protected intellectual property can operate on the programmable device.

In another aspect, the present invention provides a method for disabling a programmable device during operation of the programmable device. The method includes a) determining whether a run time limit has been set for an intellectual property block by using license information associated with the intellectual property block when implemented on the programmable device; b) measuring a time elapsed value during operation of the programmable device; and c) disabling the programmable device after the time elapsed value reaches the run time limit.

In another aspect, the present invention provides a programmable device that can be operationally limited during operation. The programmable device includes a protected intellectual property block, a clock, a memory, and circuitry. The clock is operable to measure a run time. The memory includes a run time limit that has been selected at least in part using license information associated with the protected intellectual property block. The circuitry is configured to disable the programmable device after the clock measures that the run time has reached the run time limit.

In yet another aspect, the present invention provides a computer program product associated with a computer readable medium including computer code which when executed on a computer performs a process of limiting the operation of a protected intellectual property block on a programmable device. The computer program product includes a) computer code for identifying license information associated with the protected intellectual property block, wherein the license information indicates whether the protected intellectual property block should be implemented with a limit on run time during which the protected intellectual property can operate on the programmable device; b) computer code for implementing the protected intellectual property block on the programmable device; and c) computer code for limiting the operation of the protected intellectual property on the programmable device based on the license information.

Further details and advantages of the invention are provided in the following Detailed Description and the associated figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which.

DETAILED DESCRIPTION OF THE INVENTION

Figure 1:
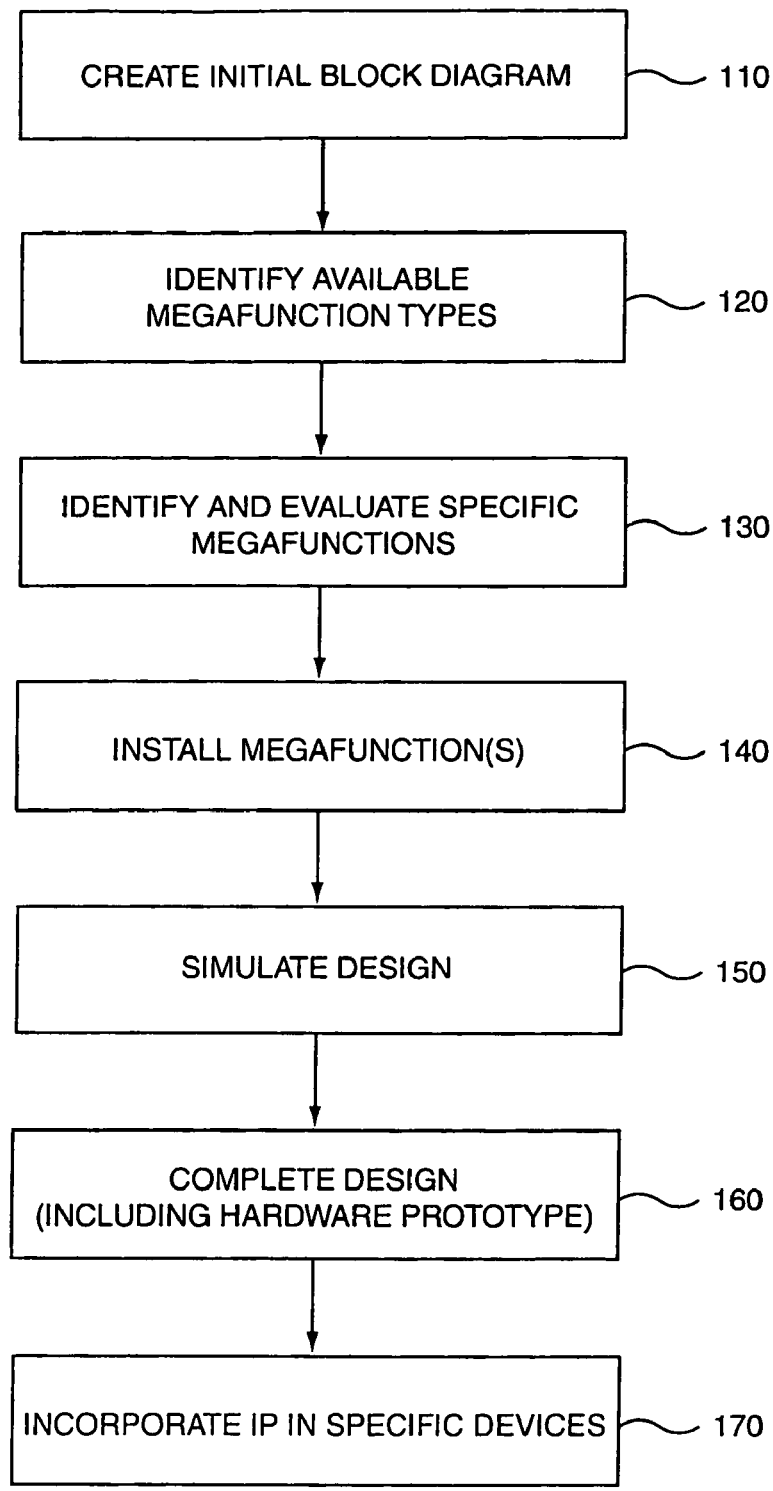
FIG. 1 is a block diagram showing a prior art design cycle for a digital system.

The following detailed description of the invention will be with reference to one or more embodiments of the invention, but is not limited to such embodiments. The detailed description is intended only to be illustrative. Those skilled in the art will readily appreciate that the detailed description given herein with respect to the FIGURES is provided for explanatory purposes as the invention extends beyond these limited embodiments. For example, the present invention is described in connection with designing a digital system and prohibiting unauthorized use in a production setting. However, the present invention can be used to limit and/or prohibit many types of unauthorized use of an owner's IP. Consequently, the present invention is not limited solely to the prototype testing/production situation. Moreover, the present invention is described herein in connection with a PLD. Again, however, the present invention may be incorporated into and used with other hardware and with other devices. Moreover, other methods and techniques could be used to permit more thorough development and use of digital systems and devices by designers while protecting the proprietary interests of the owners of the intellectual property incorporated in such systems and devices.

The present invention allows the owner of intellectual property to distribute IP such as programming object files or "POF files" (or authorization codes to create such files) suitable for limiting the end customer's use of the owner's IP (for example, allowing only hardware prototype testing). The end customer cannot use this POF file in an unlimited or otherwise unauthorized manner (using the same example, in a production setting). Consequently, the proprietary interests of the IP owner are better protected because a party being given only limited authority to use the owner's IP (again, for example, in testing a hardware prototype or in connection with limited production or commercial uses) will not be able to engage in the unauthorized use of the IP owner's intellectual property. In the various embodiments disclosed, the owner can limit the time during which the licensee can use the IP and/or the mode or manner in which the IP is used.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Figure 4:
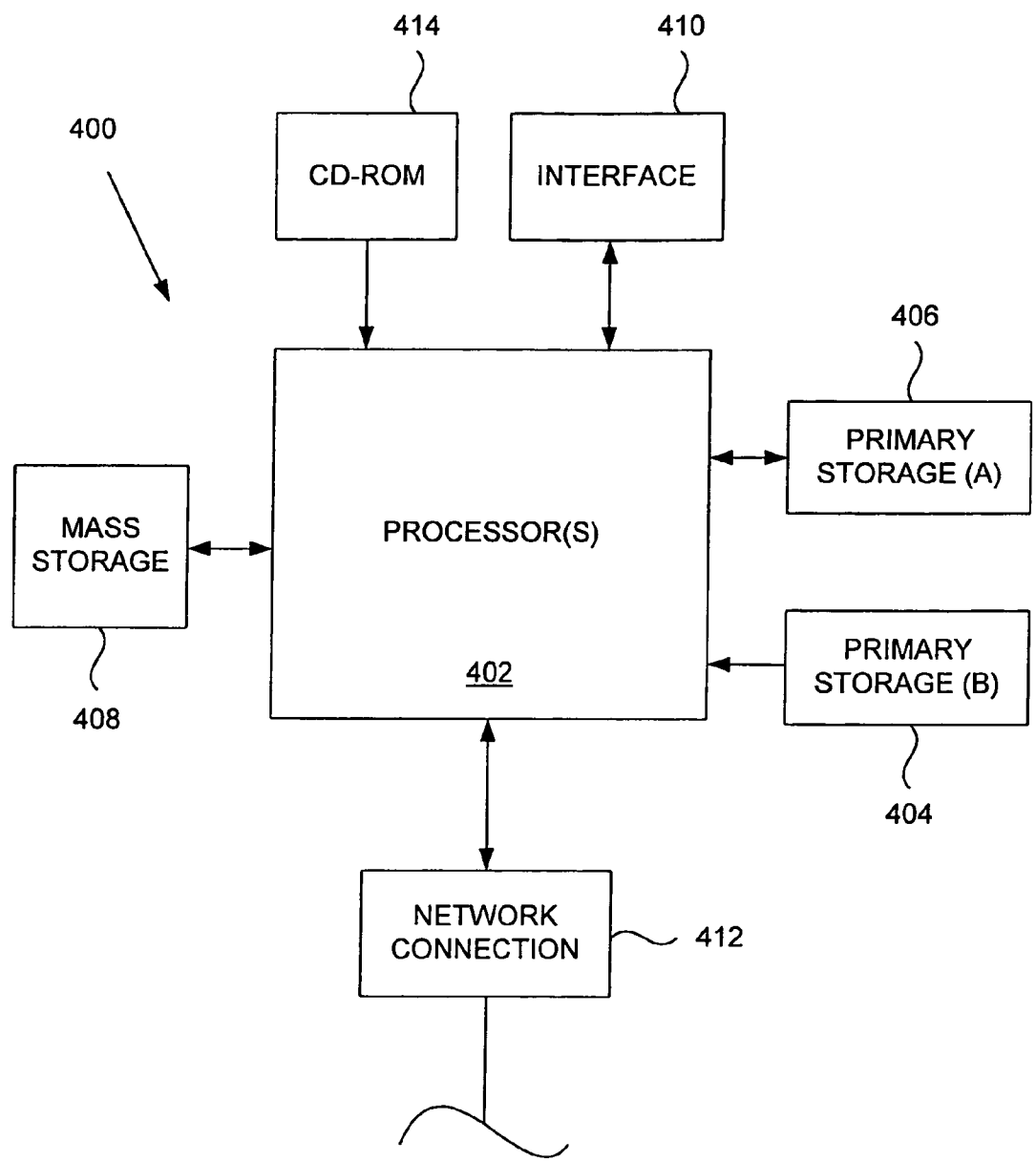
FIG. 4 is a block diagram of a computer system that may be used to implement various aspects of this invention such as the various image analysis algorithms of this invention.

FIG. 4 illustrates a typical computer system that, when appropriately configured or designed, can serve as an image analysis apparatus of this invention. The computer system 400 includes any number of processors 402 (also referred to as central processing units, or CPUs) that are coupled to storage devices including primary storage 406 (typically a random access memory, or RAM), primary storage 404 (typically a read only memory, or ROM). CPU 402 may be of various types including microcontrollers and microprocessors such as programmable devices (e.g., CPLDs and FPGAs) and unprogrammable devices such as gate array ASICs or general purpose microprocessors. As is well known in the art, primary storage 404 acts to transfer data and instructions uni-directionally to the CPU and primary storage 406 is used typically to transfer data and instructions in a bi-directional manner. Both of these primary storage devices may include any suitable computer-readable media such as those described above. A mass storage device 408 is also coupled bi-directionally to CPU 402 and provides additional data storage capacity and may include any of the computer-readable media described above. Mass storage device 408 may be used to store programs, data and the like and is typically a secondary storage medium such as a hard disk. It will be appreciated that the information retained within the mass storage device 408, may, in appropriate cases, be incorporated in standard fashion as part of primary storage 406 as virtual memory. A specific mass storage device such as a CD-ROM 414 may also pass data uni-directionally to the CPU.

CPU 402 also is coupled to an interface 410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to an external device such as a database or a computer or telecommunications network using an external connection as shown generally at 412. With such a connection, it is contemplated that the CPU might receive information from the network, or might output information to the network in the course of performing the method steps described herein.

In one embodiment, a system such as computer system 400 used by a customer is in communication with a similar computer system managed by the IP owner. Information and programs, including POF files and other files can be provided via an interface 412 for downloading by the customer. Alternatively, such information, programs and files can be provided to a customer on a storage device. Once in a customer's possession, a memory device such as primary storage 406 or mass storage 408 buffers or stores, at least temporarily, a POF file or other data. The files and other data obtained by the customer from the IP owner can then be used in connection with a hardware device, such as a programmable logic device. The details of how IP owners and customers use such inventions are discussed in more detail below.

As mentioned above, the present invention can be used in a variety of ways to limit a licensee's use of the owner's IP. For purposes of this discussion, one embodiment of the present invention will be described in the context of limiting a licensee's use of an owner's IP during the design of a digital system. While this embodiment provides a good example of how the present invention can be used, the example is in no way limiting at all with respect to the scope of the invention.

Figure 2A:
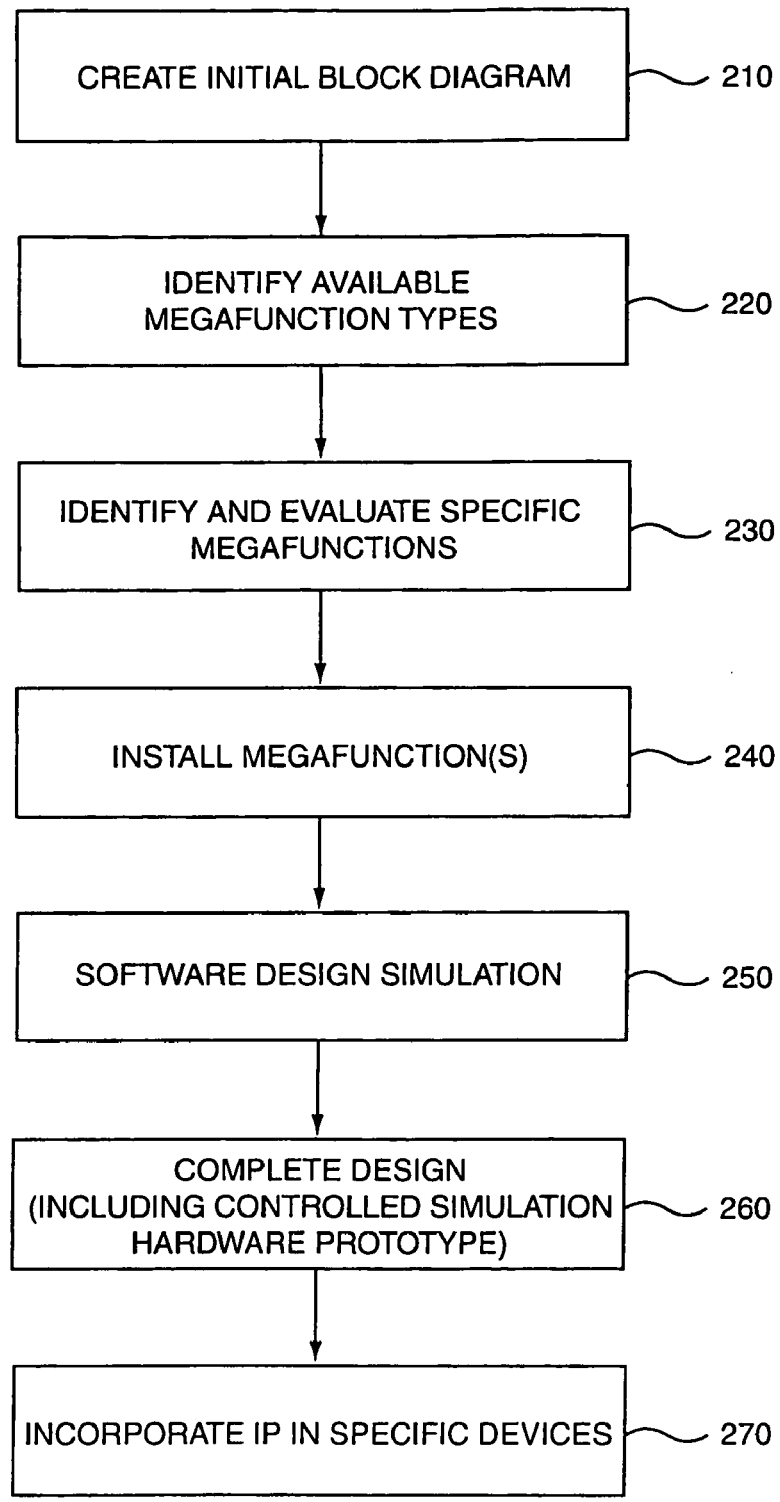
FIG. 2A is a block diagram showing a design cycle for a digital system in which the design cycle incorporates one embodiment of the present invention for controlling testing of prototype hardware and IP.

A design cycle (using, for example, Altera's OpenCore technology) incorporating one embodiment of the present invention is shown in FIG. 2A. A designer creates an initial block diagram 210 and subsequently identifies any megafunctions available for use in the anticipated system 220. The designer then can identify and evaluate one or more specific megafunctions 230 in terms of functionality and the range of parameterization available. After finding the appropriate megafunction(s), the designer then can install the megafunction(s) 240 and simulate performance 250 within the anticipated circuitry and system using a software simulation. Using the present invention in such applications, the designer can fully validate and complete the system's design, as called for in step 260, while allowing the IP owner to protect the owner's proprietary interests in the licensed IP. A hardware prototype platform typically is and can be run for a longer period of time than is practical for software simulation, thus allowing a more thorough testing of the newly designed system. Once this prototype validation is completed, the IP used can be incorporated into specific devices 270 and be put into production use.

There are a variety of protective approaches available within the context of the present invention. One embodiment of the invention limits the temporal operation of the IP in a hardware prototype setting, making relatively extended periods of use of the intellectual property, needed for production use of the IP, impossible. Another approach limits the physical and/or electrical operation of the intellectual property, thus prohibiting use of the intellectual property in a production setting.

Figure 2B:
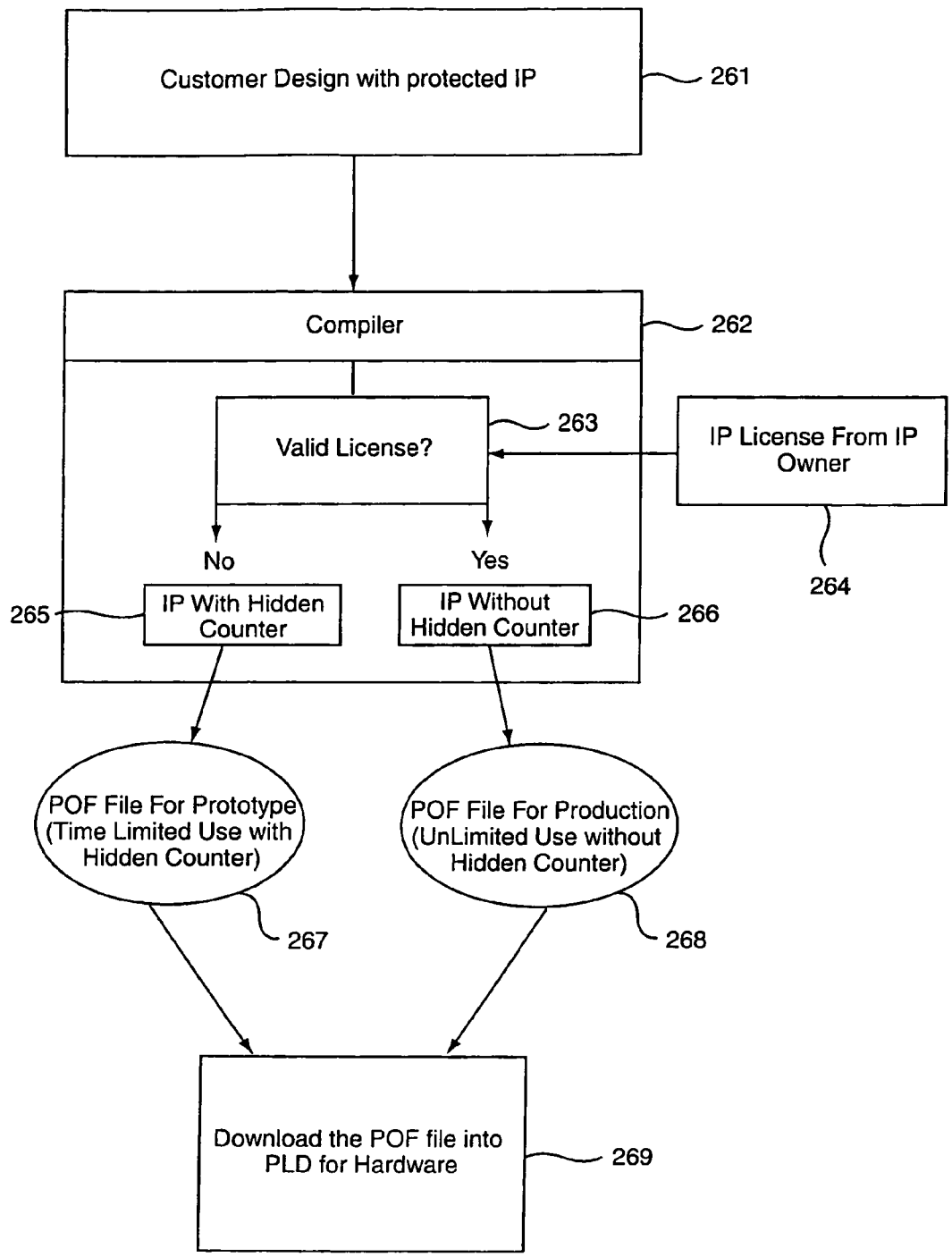
FIG. 2B is a block diagram showing a technique for controlling downloading of IP according to one embodiment of the present invention.

In one embodiment of the invention, the IP owner creates and distributes software which disables a prototype hardware platform after a prescribed clock count. By disabling the hardware platform within a limited time period, the IP owner reduces or eliminates the risk of a party using software and IP intended for prototype testing in a production setting. An embodiment utilizing a time limited prototype testing version and an unlimited production version of the IP is shown in FIG. 2B. At 261, a customer has a design that incorporates IP protectable by one embodiment of the present invention. When the customer contacts the owner's compiler at 262 (for example, Altera's Quartus or MAX+PLUSII), a determination is made at 263 as to whether the designer has obtained an appropriate IP license from the owner at 264. If not, then the customer is provided at 265 with a version of the IP containing a hidden counter. If the customer has a valid IP license from the owner, then at 266 the designer is provided with a version of the IP without the hidden counter. It should be noted that the owner might offer more than only two versions of the IP (or offer more types of licenses, depending on the range of potential uses for customers), making certain versions available only to appropriate licensees, thereby controlling more carefully the use of the owner's IP in prototype testing and production uses as well.

If the IP contains the counter, then the POF file generated at 267 is for prototype testing only (that is, in this embodiment, time limited in its use). If the IP has no counter, then the POF file generated at 268 is unlimited and the IP may be used accordingly. Finally, at 269, the designer downloads the appropriate POF file into the PLD for implementation with whatever hardware is in use.

Figure 2C:
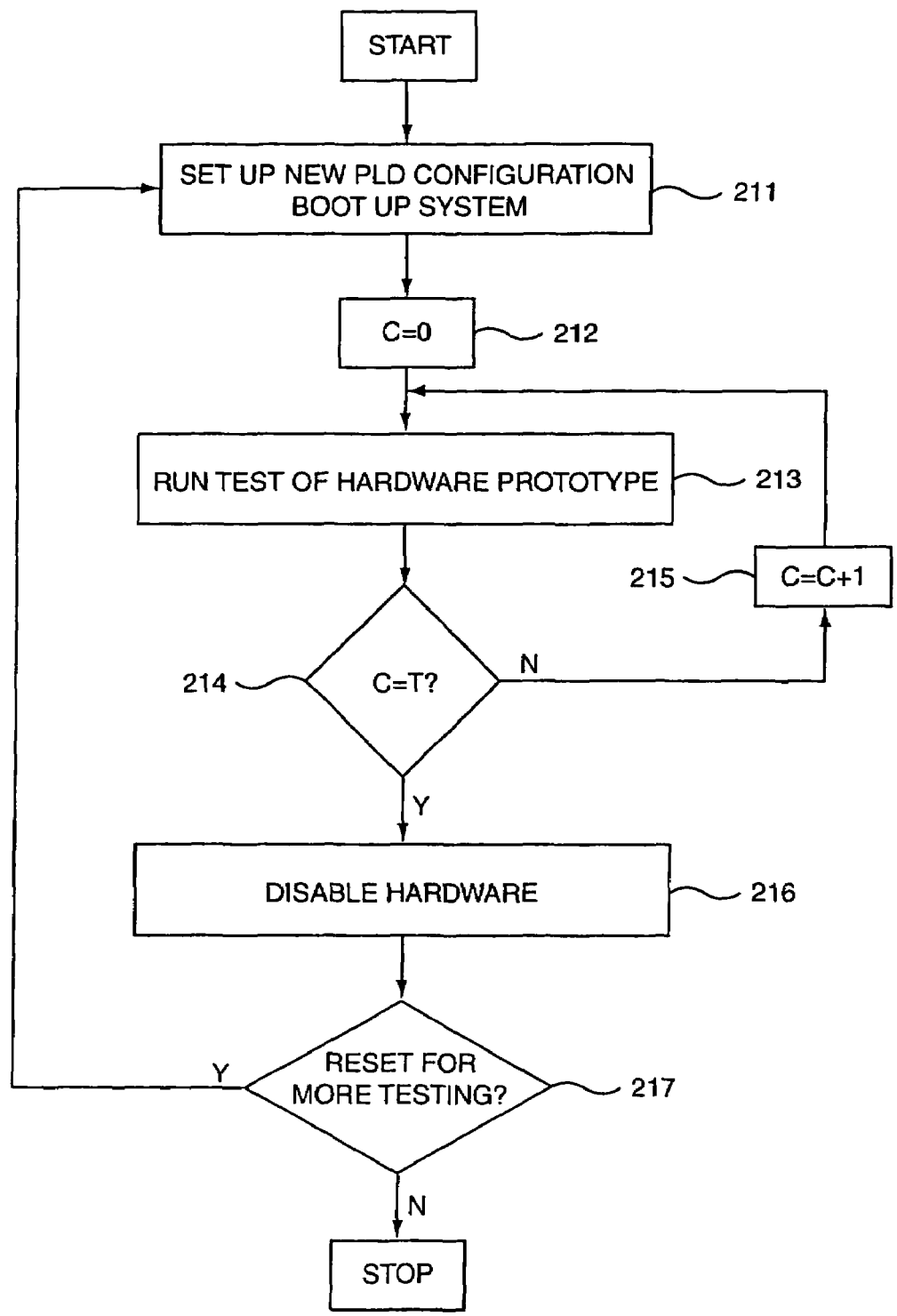
FIG. 2C is a block diagram showing a technique for controlling prototype testing of hardware using a counter according to one embodiment of the present invention.

FIG. 2C illustrates one example of a counter usable in the embodiment of the present invention shown in FIG. 2A and FIG. 2B. The party testing its system sets up a new PLD configuration and boots up the system at step 211, using a prototype testing POF file provided by the IP owner or generated by the customer using an authorization code provided by the IP owner (for example, as provided at step 267 in FIG. 2B). At the beginning of the testing procedure, at step 212, the IP owner's software initializes its protection counter C=0.

The software then performs the next step of the testing of the hardware prototype at step 213. At each clock measured step of the testing, the software checks to see if the clock counter C has reached the time limit T (step 214) set by the IP owner for disabling the hardware platform. If the counter C has not yet reached T, then the counter C is incremented at step 215, C=C+1, and the software continues testing.

If the protection counter C has reached the prescribed limit T at step 214, then the system is disabled (for example, by going into its protected idle state) at step 216. The party testing its hardware platform can then decide at step 217 whether to reset the counter for more testing. If more testing is desired, then the testing party must return to step 211 and set up a new PLD configuration and/or re-boot the system, which begins the time limited operation of the IP owner's software again.

This approach is based on the IP owner's knowledge and use of the clock system value of the end customer. This information is obtained from the testing party when the testing party requests the IP from the owner for testing on the hardware platform. The IP owner will add a protection counter clocked to his IP using this known clock frequency, and will use the terminal count T of the protection counter to disable the IP and force the IP to go into a protected idle state where the IP stops working. This protected idle state could be a reset of one or more (or all) registers, a global tri-state of the IO, or even a random failure or a combination of failures. The IP owner controls the mode(s) of failure. Based on the known clock frequency and the length of the protection counter, the IP owner controls the minimum time before IP failure, after which the IP switches to its protected idle state.

For PCI applications, the typical system clock is 33 MHz or 66 MHz; for T1/E1 applications it is 8 kHz. By way of example, for 33 MHz PCI applications, and to force the IP into its protected idle state after one hour, a 47 bit protection counter C must reach a terminal count T of $30*10^9*60*60=1.08e14$. The IP owner can conceal a logic module (for example, a counter) in the IP for use in a hardware prototype. This logic module inserted by the IP owner sets a temporal hardware limitation which makes the IP provided for hardware prototype use unsuitable for production uses. In this embodiment, when the 47 bit counter reaches the value 1.08e14, the PCI IP goes into its protected idle state. This uses about 47 logic elements, covering approximately 0.3% of the area of a typical PLD (for example, the APEX400 made by Altera Corp.). The PCI IP in the hardware PLD prototype board will stop working after one hour of operational run time (as counted by the hardware platform, not necessarily the total elapsed time).

In one embodiment, the only way to exit the protected idle state is to re-configure the PLD or re-boot the entire system. This may be acceptable for prototype testing, but might not be acceptable in production in the system, which could need to stay configured longer than the one hour time limit allowed by the IP owner.

Because the disabling subroutine of the IP software can be made small compared to the rest of the prototype testing POF file, it is impractical for the testing party to attempt to remove protection counter C from the POF file. Moreover, it is similarly impractical for the customer to try to locate the logic and/or memory cells used for the protection counter in the hardware platform to avoid the disabling of the hardware. As a result, the end customer cannot use the POF file in production because the typical production system will not support the required periodic re-configuration or system re-booting. To use the IP in a production setting, the end customer will need to purchase a production POF file (or an authorization code allowing the customer to generate a suitable production POF file) which does not force the system to be repeatedly re-configured.

Because the IP owner will be able to limit prototype hardware testing using software, a customer will be able to download IP from a web site, simulate it, compile it, and generate a prototype testing POF file with the IP, which contains the protection counter. A separate license from the IP owner will be required to generate a production POF file that contains the IP without the protection counter.

In lieu of (or in addition to) a temporal limitation on the use of a prototype testing POF file, an IP owner also can impose physical, electrical and/or other modal or operational limits on the prototype testing software to permit sufficient hardware prototype testing. While such modal and/or operational limits will allow a customer to thoroughly test the hardware platform to complete the design process, these limits will prevent use of the IP and software in a production setting.

There are a wide variety of parameters that are susceptible to limitation consistent with the present invention. While this disclosure will discuss several specific techniques in this regard, the present invention is not limited to these particular methods and techniques. Various hardware devices and types of software will provide different opportunities for suitable limitation.

First, the IP owner can limit the number or type of input and/or output signals used by the software. For example, if a given device or application requires 20 input signals to function in a production setting, the IP owner may limit the prototype testing of the hardware platform to 18 input signals, providing software capable of thoroughly testing the prototype, but being incapable of operating in a production setting. If a customer attempts to add the needed signals (that is, if the hardware detects the additional, needed signals), the hardware will then fail in a suitable manner (for example, a reset of one or more registers, a global tri-state of the hardware IO, or a random failure of some type).

Analogously, the IP owner can limit the output signals generated by the hardware platform. For the same reasons, limiting the output signals may provide a thorough testing environment, but make production use of the IP and hardware platform impossible. Limitation of outgoing signals from the hardware platform may also include preventing monitoring what the IP is doing or its status. Such monitoring may not be necessary for hardware prototype testing, but typically is essential in production uses.

The data format used in the prototype hardware platform also can be limited in a way that allows a customer to test the hardware platform without making production feasible. For example, according to the J.711 standard, data compression algorithms differ between the United States and Europe. In one embodiment, using the differences established by such a standard, a data compression standard limitation can be imposed for prototype testing. In the United States, the compression standard for communications data is "µ-flow" based. In Europe, the compression standard for communications data is "a-low" based. By limiting the prototype testing to only one standard for testing of an international communications system, an IP owner can make testing practical, while use in the intended hardware system would be impossible.

As can be seen from the foregoing examples, there are numerous ways to limit the prototype testing of the hardware platform. While one or more embodiments of the present invention currently involve imposing limits via the software used on a prototype hardware platform, it may also be possible to impose operational limits within the hardware device itself. For example, a prototype mask, well known to those skilled in the art, might be usable for creating a PLD or other device, making the device circuitry impractical for production uses in one or more applications, but making testing of prototypes feasible. The device needed for production use could then be created using a production mask work. In actual practice the difference between the prototype mask and production mask might be nothing more than a single layer in the mask array that alters the device's circuitry in a minimal and practically unchangeable manner. Similarly, a device such as a PLD fabricated for prototype testing might be augmented by the addition or deletion of a feature as simple as a fuse. Such augmentation could be implemented using laser programming.

As can be seen from the foregoing discussion, there are numerous ways to create a prototype testing configuration for a system that has passed the simulation phase of development and design. Such prototype configurations, whether achieved through augmentation of software or hardware, will prevent the unauthorized use of IP outside limits imposed by the owner of that intellectual property. Such safeguards will help ensure the protection of IP owners' proprietary rights in this technology.

Figure 3:
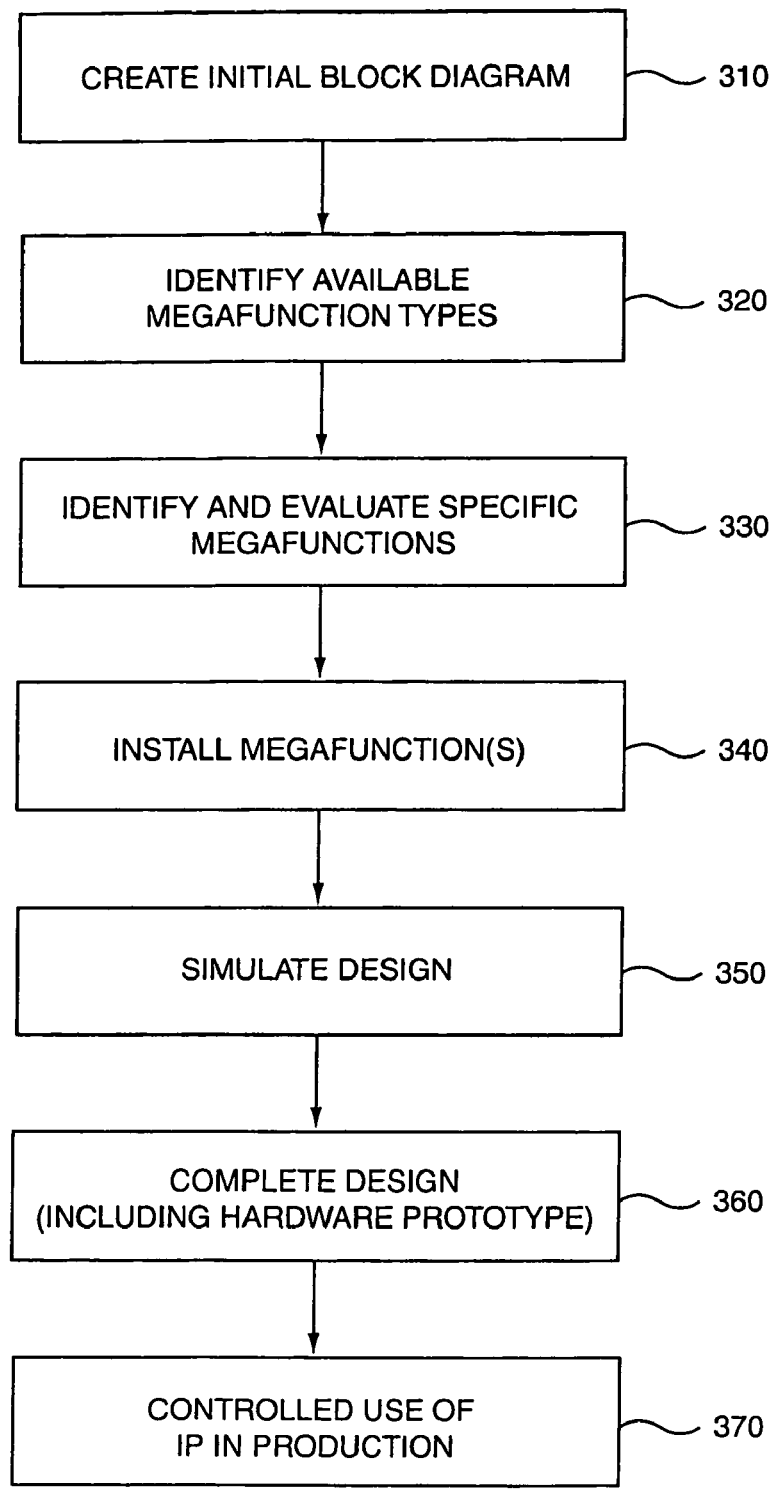
FIG. 3 is a block diagram showing a design cycle for a digital system in which the design cycle incorporates one embodiment of the present invention for controlling production operation of hardware and IP.

The present invention also can be used to control production use of the owner's IP as well. A design cycle incorporating another embodiment of the present invention is shown in FIG. 3. A designer creates an initial block diagram 310 and subsequently identifies any megafunctions available for use in the anticipated system 320. The designer then can identify and evaluate one or more specific megafunctions 330 in terms of functionality and the range of parameterization available. After finding the appropriate megafunction(s), the designer then can install the megafunction(s) 340 and simulate performance 350 within the anticipated circuitry and system. The designer can complete the system's design, as called for in step 360 (including, perhaps, using one embodiment of the present in the testing process). Once the prototype validation is completed, the IP used can be incorporated into specific devices 370 and be put into production use. This production use, however, also can be controlled in the same way testing is controlled. The POF file downloaded by the designer may limit or otherwise control operation of the hardware through techniques similar to those discussed in connection with the controlled testing of hardware.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Hence, all suitable modifications and equivalents are deemed to fall within the scope of the invention.

We claim:

1. A method for limiting operation of a protected intellectual property block on a programmable logic device (PLD), the method comprising:
   (a) identifying license information associated with the protected intellectual property block, wherein the license information indicates whether the protected intellectual property block should be implemented with a limit on run time during which the protected intellectual property block can operate on the programmable logic device;
   (b) implementing the protected intellectual property block on the programmable logic device; and
   (c) limiting the operation of the protected intellectual property block on the programmable logic device based on the license information by limiting operation of a portion of the protected intellectual property block, wherein limiting the operation of the portion of the protected intellectual property block comprises resetting a register in the programmable logic device to disable the portion.

2. The method of claim 1 wherein limiting the operation of the protected intellectual property block comprises:
   measuring the run time during operation of the programmable logic device;
   determining whether the run time has reached the limit; and
   limiting the operation of the protected intellectual property block on the programmable logic device when the run time has reached the limit.

3. The method of claim 2 wherein measuring the run time is performed using an internal clock associated with the programmable logic device.

4. The method of claim 1 wherein limiting the operation of the protected intellectual property block comprises disabling the programmable logic device when the run time has reached the limit.

5. The method of claim 4 wherein an internal clock of the programmable logic device is used for measuring the run time.

6. The method of claim 1 wherein the limit corresponds to a prototype operation range.

7. The method of claim 1 wherein the limit corresponds to a production operation range.

8. A method for disabling a programmable logic device (PLD) during operation of the programmable logic device, the method comprising:
   determining whether a run time limit has been set for a protected intellectual property block by using license information associated with the protected intellectual property block when implemented on the programmable logic device;
   measuring a time elapsed value during operation of the programmable logic device; and
   disabling the programmable logic device when the time elapsed value reaches the run time limit by imposing modal and operational limits on a portion of the protected intellectual property block and resetting a global tri-state of programmable logic device I/O.

9. The method of claim 8 wherein measuring the time elapsed value is performed using an internal clock associated with the programmable logic device.

10. The method of claim 8 wherein disabling the programmable logic device comprises resetting a register in the programmable logic device.

11. The method of claim 8 wherein disabling the programmable logic device comprises causing a random failure of the programmable logic device.

12. A programmable logic device (PLD) that is operationally limited during operation, comprising:
   a protected intellectual property block;
   a clock configured to measure a run time;
   a memory including a run time limit that has been selected at least in part using license information associated with the protected intellectual property block; and
   circuitry configured to disable the programmable logic device when the run time has reached the run time limit by resetting a register in the programmable logic device to disable operation of a portion of the protected intellectual property block.

* * * * *